UNITED STATES PATENT OFFICE.

WILLIAM W. REED, OF BUFFALO, NEW YORK.

FOOD COMPOSITION.

1,255,638.

Specification of Letters Patent. Patented Feb. 5, 1918.

No Drawing. Application filed September 28, 1917. Serial No. 193,849.

*To all whom it may concern:*

Be it known that I, WILLIAM W. REED, a citizen of the United States of America, residing at No. 56 Berkley Place, in the city of Buffalo, county of Erie, and State of New York, have invented a new and useful Food Composition, of which the following is a specification.

The objects of my invention are to provide a well balanced ration which shall contain substantially every element necessary for the building of the human body; and to provide a food which shall be easily and quickly digested.

My composition consists of a mixture of chocolate, and shredded wheat, preferably ground, with a seasoning of fruit and nuts. In preparing the composition, I prefer to use the ingredients in the following proportions:

53   per cent. of chocolate;
    24.5 per cent. of ground shredded wheat;
       with sufficient fruit, nuts and salt to flavor it, preferably as follows:—
         10   per cent. of fruit;
         10   per cent. of nuts;
         2.5 per cent. of salt.

By "ground shredded" wheat I do not mean a wheat "meal" or "flour" but a "chopped" or short threadlike ingredient, which causes the composition to escape being a "dough" or "plaster," and presents to the mouth of the consumer a more palatable and chewable article. Previous cooking of the "shredded wheat" tends to preserve this "threaded" condition.

While the ingredients may be mixed in the percentage proportions above outlined, they may, if desired, be combined as to weight according to the following proportions:

Fifty pounds of chocolate;
    Twenty-five pounds of shredded wheat;
    Ten pounds of fruit;
    Ten pounds of nuts;
    One-quarter pound of salt.

The ingredients are placed in a mixing kettle where they are heated and thoroughly mixed, in the presence of moisture, after which they are poured out and cut into cakes of a suitable size, from which the moisture largely evaporates.

These cakes stiffen and glaze into a very easily handled and attractive article, and experiments made indicate that children will claim this article in preference to homemade candy, in spite of the more "plebeian" composition and designed use.

While I have described certain proportions of the different ingredients, it is obvious that I may vary these proportions slightly as desired according to the taste of the consumer and the availability of material, particularly as to the fruit, nuts and salt.

Having thus described my invention, what I claim is:

1. The herein described food composition comprising chocolate and shredded wheat, seasoned with fruit, nuts and salt.

2. The herein described food composition comprising chocolate and ground, shredded wheat, seasoned with fruit, nuts and salt.

3. The herein described food composition approximating 53 per cent. of chocolate, 24.5 per cent. of ground, shredded wheat, 10 per cent. of fruit, 10 per cent. of nuts, and 2.5 per cent. of salt.

4. The herein described food composition approximating chocolate, 50 pounds; ground, shredded wheat, 25 pounds; fruit, 10 pounds; nuts, 10 pounds; and salt, ¼ pound.

In testimony whereof, I have hereunto signed my name.

WILLIAM W. REED.